(12) United States Patent
Seddigh et al.

(10) Patent No.: US 6,975,592 B1
(45) Date of Patent: Dec. 13, 2005

(54) CONFIGURABLE RULE-ENGINE FOR LAYER-7 AND TRAFFIC CHARACTERISTIC-BASED CLASSIFICATION

(75) Inventors: Nabil N. Seddigh, North Gower (CA); Biswajit B. Nandy, Kanata (CA); Don W. Bennett, Ottawa (CA); Yajun Liu, Nepean (CA); Dabin Wang, Nepean (CA); Carl F. Cao, Nepean (CA)

(73) Assignee: Nortel Networks Limited, (CA)

( * ) Notice: Subject to any disclaimer, the term of this patent is extended or adjusted under 35 U.S.C. 154(b) by 1031 days.

(21) Appl. No.: 09/717,292

(22) Filed: Nov. 22, 2000

(51) Int. Cl.[7] ............................................. H04L 12/24
(52) U.S. Cl. ................. 370/230; 370/235; 370/395.21; 370/395.42
(58) Field of Search ............................. 370/229–240, 370/395.21, 395.4–395.43

(56) References Cited

U.S. PATENT DOCUMENTS 6,445,679 B1 * 9/2002 Taniguchi et al. .......... 370/232
6,587,466 B1 * 7/2003 Bhattacharya et al. . 370/395.21
6,594,268 B1 * 7/2003 Aukia et al. ................ 370/400
6,598,034 B1 * 7/2003 Kloth .......................... 706/47
6,625,150 B1 * 9/2003 Yu .............................. 370/389

OTHER PUBLICATIONS

Chapman, A., et al., Automatic Quality of Service in IP Networks, Proc., The Canadian Conf. on Broadband Research, Ottawa, Canada, Apr. 1997, pp. 184-189.

* cited by examiner

*Primary Examiner*—Chi Pham
*Assistant Examiner*—Thai Hoang
(74) *Attorney, Agent, or Firm*—Steubing McGuinness & Manaras LLP

(57) ABSTRACT

A system and method for data flow classification based on a configurable rule-engine, is presented herein. In accordance with an embodiment of the invention, the system includes a data flow managing mechanism configured to identify, track, and manage the data flows and a rule set, which includes a plurality of rules for comparing information contained within data flow with pre-specified values. The system also includes a configurable classification rule engine for classifying the data flows into one of a plurality of traffic classes based on results of the comparisons. The configurable classification rule engine is configured via a configuration file that specifies and allows for the modification and reconfiguration of the pre-specified values and information regarding the data flows, the rule set, and the traffic classes.

42 Claims, 7 Drawing Sheets

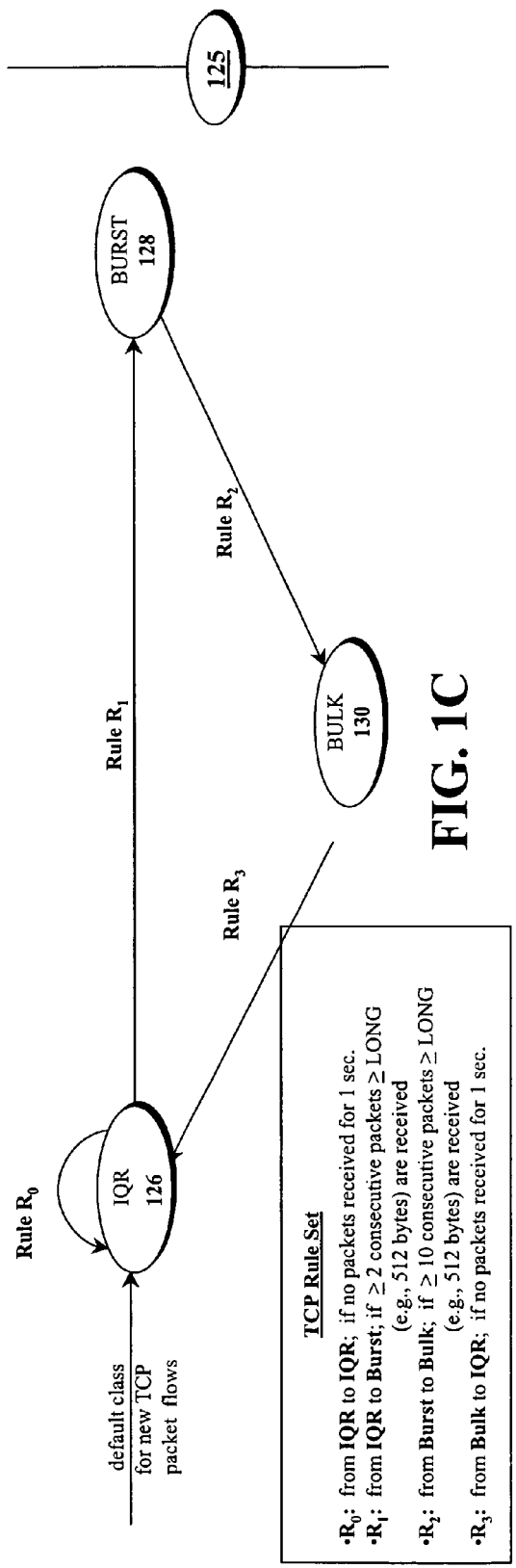

FIG. 1C

TCP Rule Set

- $R_0$: from IQR to IQR; if no packets received for 1 sec.
- $R_1$: from IQR to Burst; if $\geq 2$ consecutive packets $\geq$ LONG (e.g., 512 bytes) are received
- $R_2$: from Burst to Bulk; if $\geq 10$ consecutive packets $\geq$ LONG (e.g., 512 bytes) are received
- $R_3$: from Bulk to IQR; if no packets received for 1 sec.

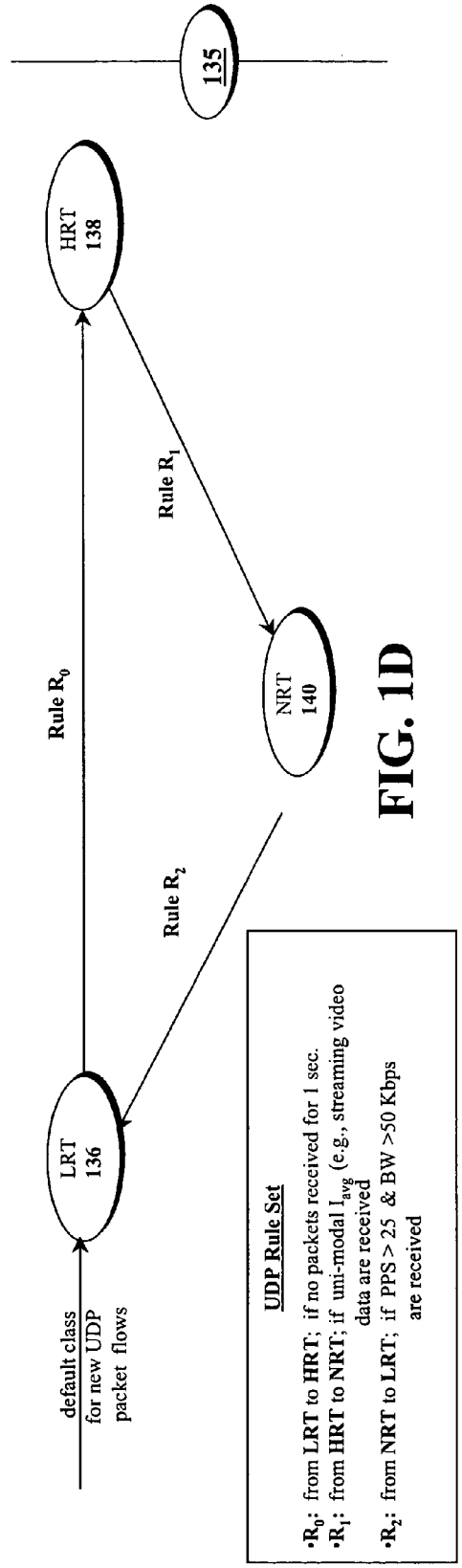

FIG. 1D

UDP Rule Set

- $R_0$: from LRT to HRT; if no packets received for 1 sec.
- $R_1$: from HRT to NRT; if uni-modal $I_{avg}$ (e.g., streaming video data are received
- $R_2$: from NRT to LRT; if PPS > 25 & BW > 50 Kbps are received

CLASSIFICATION RULE ENGINE CONFIGURATION FILE

```
#Set the bps for port 1 to 10Mbps and port 2 to 5Mbps
bandwidth 1 10000000;
bandwidth 2 5000000;

#Enable the static Layer-7 classifier by default; Can change to Dynamic Classifier by changing the setting to policy dynamic
policy static;

# Define 2 classes of Traffic
class high;
class low;

# These two queues use a bounded strict priority scheduler in which# the high priority queue can consume 70% of available bandwidth and# the low #priority queue can consume all remaining bandwidth. The# low priority queue is the default queue.
scheduler bsp {
    queue high 70;
    queue low 100 default;
}

# MBase Application: UDP, high priority class
application mbase 17 high;

# Search first 10 bytes of first packet for pattern
appRule mbase 1 pattern "meDIabASe" 0 10;

# Dynamic Classifier Rules – Transition from High to Low Priority Class
dynamicRule high low OR NOT belowThresh 85;
dynamicRule high low OR belowThresh 93;

# Dynamic Classifier Rules – Transition from Low to High Priority Class
dynamicRule low high OR belowThresh 85;
dynamicRule low high AND NOT belowThresh 93;
```

CONFIGURABLE RULE-ENGINE FOR LAYER-7 AND TRAFFIC CHARACTERISTIC-BASED CLASSIFICATION

BACKGROUND OF THE INVENTION

1. Field of the Invention

This invention generally relates to the field of data communication systems. More particularly, the invention presents a configurable and extensible rule-engine capable of classifying and supporting packet traffic.

2. Description of Related Art and General Background

The unprecedented growth of the Internet has not only increased the amount of traffic that communication networks must support, it has also transformed the nature of network traffic. The Internet was once relegated to handling Internet Protocol (IP)-based transmissions in the form of Telnet, e-mail, and File Transfer Protocol (FTP) traffic originating from wired LAN/WAN networks. Since then, the Internet has evolved into a global information infrastructure capable of accommodating a wide variety of applications, such as World-Wide Web (WWW), Voice-over-IP (VoIP) and Audio/Video Playback, generated from a diverse et of media, including satellite, wireless, and optical platforms.

Presently, IP-based networks attempt to accommodate the traffic generated by such applications by providing a "best-effort" level of service. As such, all IP data packets must compete for available bandwidth, as well as processing capability and buffer space in the network routing devices. The use of IP-based applications with real-time/interactive requirements coupled with the relatively limited bandwidth capacity in access and wireless networks precipitates the need to differentiate between the different traffic flows generated by these applications.

To this end, networks have incorporated classification mechanisms to differentiate among the various traffic flows flowing through the network. These mechanisms employ packet classification schemes to help identify which data packets receive the necessary treatment to ensure a best-effort level of service.

A common approach implemented by these classification mechanisms is to classify the traffic into a static set of coarse traffic classes based on certain application requirements. Based on these coarse traffic classes, network routing devices provide differentiated treatment.

Currently, some classification mechanisms perform packet classification based on Layer-4 (Transfer Control Protocol (TCP)/User Datagram Protocol (UDP)) Port Numbers. Although relatively simple to implement, such classification may be easily deceived by users manipulating port numbers to achieve higher levels of priority for applications. Moreover, the use of port numbers in applications, although well-known, are not mandatory, thereby compromising the efficacy of the Layer-4 classification schemes. In addition, many networks employ Internet Protocol Security (IPSec) techniques, which provide for the secure exchange of packets, but do so at the expense of encrypting information above Layer-3 (Network Layer), thus rendering Layer-4 classification futile.

Other classification mechanisms support packet classification based on Layer-7 (Application Layer) content. Such classification schemes exploit the payload information resident in the data packet to better identify the type of application associated with the traffic and overcomes the limitations of Layer-4 classification schemes noted above. However, Layer-7 classification schemes require a larger, more robust set of rules to operate effectively and is still subject to the classification barriers imposed by IPSec techniques.

Recent efforts, as described in Chapman et al., *Automatic Quality of Service in IP Networks*, PROC. CANADIAN CONF. ON BROADBAND RESEARCH, Ottawa, Canada (April 1997, pp. 184–189), have investigated the use of flow classification schemes, which classifies flows based on traffic characteristics. Dynamic flow classification schemes examine certain flow qualities, such as, for example, transmitted packet counts and inter-arrival times, to determine the class associated with the traffic flow. The set of rules associated with dynamic flow classification schemes are, therefore, proportional to the number of classes in the classification scheme. As such, the rule set maintained by these schemes are smaller than the Layer-7 classification schemes. Moreover, because, dynamic flow classification schemes examine traffic flow behavior, such schemes may overcome the classification barriers imposed by IPSec techniques.

As noted above, conventional Layer-7 classification mechanisms employ a static set of rules, which differentiate network traffic into coarse traffic classes. Typically, these rules are hard-coded into the classification mechanisms, thus precluding network administrators from readily extending, configuring, or modifying the rules. Such rules limit the recognition and classification of traffic generated by the wide variety of applications currently supported by networking devices.

Therefore, what is needed is a system and method that provides a greater flexibility in classifying network traffic.

SUMMARY OF INVENTION

Systems and methods consistent with the principles of the present invention, as embodied and broadly described herein, include a data flow managing mechanism configured to identify track, and manage a data flow and a rule set, which includes a plurality of rules for comparing information contained within the data flow to pre-specified values. The system further includes a configurable classification rule engine for classifying the data flow into one of a plurality of traffic classes based on results of the comparisons between the rules and the pre-specified values. The configurable classification rule engine is configured via a configuration file that specifies and allows for the modification and reconfiguration of the pre-specified values and information regarding the data flow, the rule set, and the traffic classes.

BRIEF DESCRIPTION OF THE DRAWINGS

FIG. 1C illustrates a functional state diagram for TCP-based traffic.

FIG. 1D illustrates a function state diagram for UDP-based traffic.

FIG. 3 illustrates a configuration file for a packet classification rule engine in accordance with an embodiment of the present invention.

DETAILED DESCRIPTION OF THE INVENTION

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

The classification rule system, as described herein, is a configurable rule-based system capable of classifying network traffic based on application requirements. The system employs classification rules that are abstracted from the heuristics and are not hard-coded. In one embodiment, the classification system operates under a dynamic classification scheme, employing a traffic monitoring mechanism to monitor and measure certain traffic characteristics from a received data flow and compare those values to the rules invoked by the classification rule engine to designate the various classes. In another embodiment, the system operates under a Layer-7 classification scheme and examines predetermined packets containing certain application information to determine whether certain patterns, indicative of different classes, match the content of the predetermined packets.

Figure 1A:
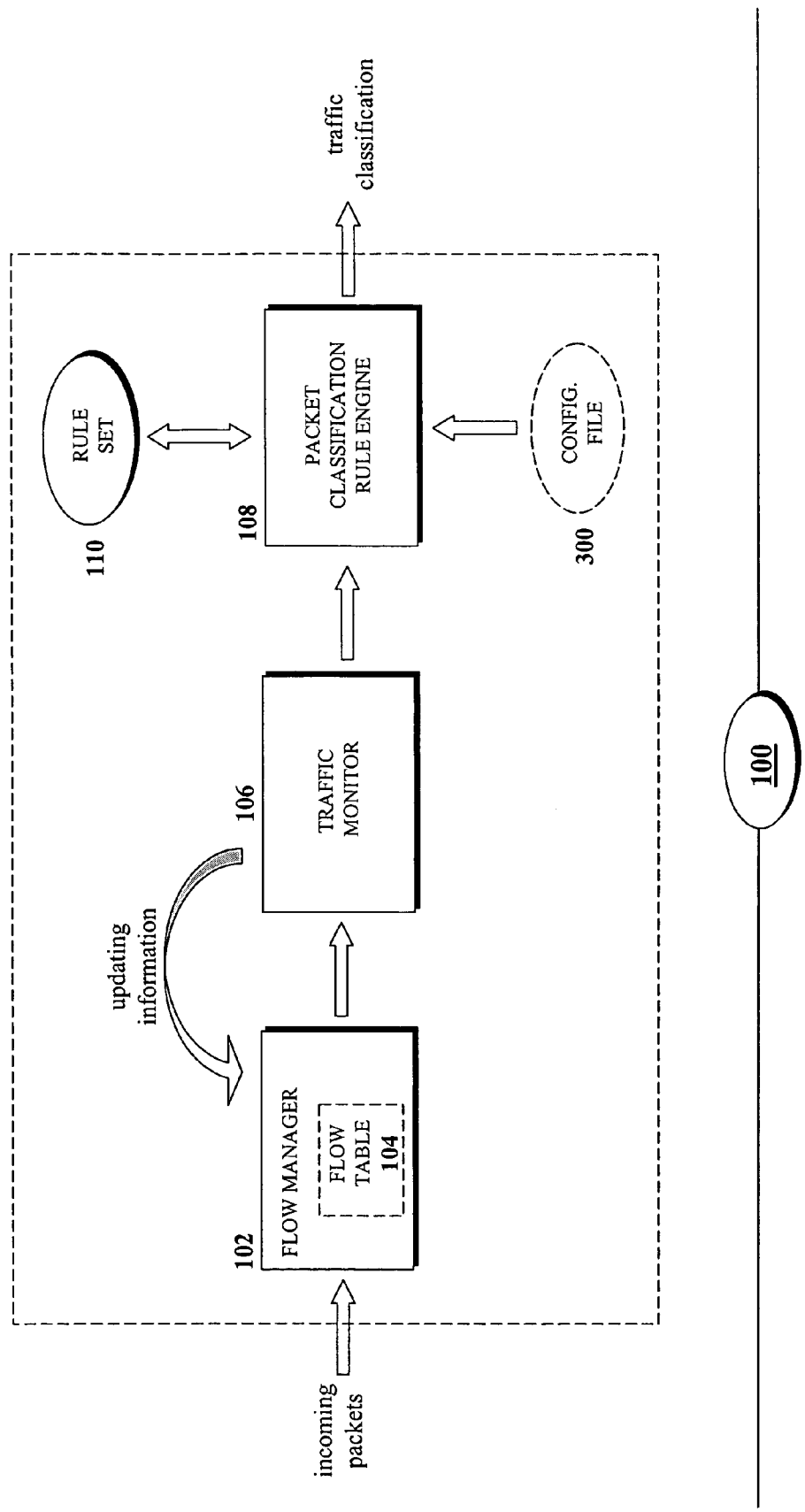
FIG. 1A depicts a functional block diagram of a classification rule engine system, constructed and operative in accordance with an embodiment of the present invention.

FIG. 1A is a functional block diagram depicting dynamic classification rule engine system 100, constructed and operative in accordance with an embodiment of the present invention. System 100 classifies network traffic based on dynamic classification schemes. As indicated in FIG. 1A, system 100 comprises flow manager mechanism 102, a traffic monitoring mechanism 106, a packet classification rule engine 108, configuration file 300, and rule set 110. As will be described below, traffic monitoring mechanism 106 and rule set 110, as well as the actions taken by packet classification rule engine 108, may be defined, initialized, and reconfigured with respect to particular traffic flows in configuration file 300.

Flow manager mechanism 102 is configured to receive the incoming data packets, identify and track the traffic flows associated with the received packets, register active data flows, and delete inactive data flows. For dynamic classification schemes, flow manager mechanism 102 may identify the traffic flows based on Source IP Address (SIP), Destination IP Address (DIP), Source TCP/UDP Port Number (SP), Destination UDP/TCP Port Number (DP) and Protocol Id (PID). Flow manager mechanism 102 may include a flow table mechanism 104, which captures the relevant packet information, provides a look-up mechanism to identify which traffic flow the receive packet belongs to, and updates the captured information accordingly. Such updates may include introducing new traffic flows or deleting stale traffic flows.

Traffic monitoring mechanism 106 is configured to measure various characteristics and parameters of each traffic flow and provides updates to the flow information resident in flow table mechanism 104, whenever a received packet is associated with a particular flow. Traffic monitoring mechanism 106 may comprise a plurality of individual monitors dedicated to measuring the various traffic flow characteristics and parameters. An exemplary sample of individual monitors are summarized in TABLE I.

TABLE I

| TMName | TMType | TMDescription |
| --- | --- | --- |
| CPLC | 0 | number of consecutive packets since last state change |
| CLP | 1 | number of consecutive long packets having a size $\geq$ LONG |
| CSP | 2 | number of consecutive short packets having a size $\leq$ SHORT |
| AVG_BW | 3 | average bandwidth measured over time interval T |
| PPS | 4 | average packets-per-second measured over time interval T |
| I_AVG | 5 | average packet inter-arrival time $I_{avg}$ |
| PIGA | 6 | number of packets with inter-arrival time greater than A = $(I_{avg} + Y * (I_{avg}))$ |
| PILB | 7 | number of packets with inter-arrival time less than B = $(I_{avg} - Y * (I_{avg}))$ |
| PS | 8 | number of packets since start of the flow |
| DIFI | 9 | inter-arrival time between current packet and previous packet in flow |
| TLP | 10 | time of last packet in flow |
| PS_AVG | 11 | average packet size measured over time interval T |
| SCP | 12 | size of current packet (includes entire packet) |
| SCPL | 13 | size of IP payload for current packet |

In one implementation, the values for indicating the size of a long and short packet (LONG, SHORT, respectively), as used in monitors CLP and CSP noted above, as well as time interval T are user-definable.

Figure 1B:
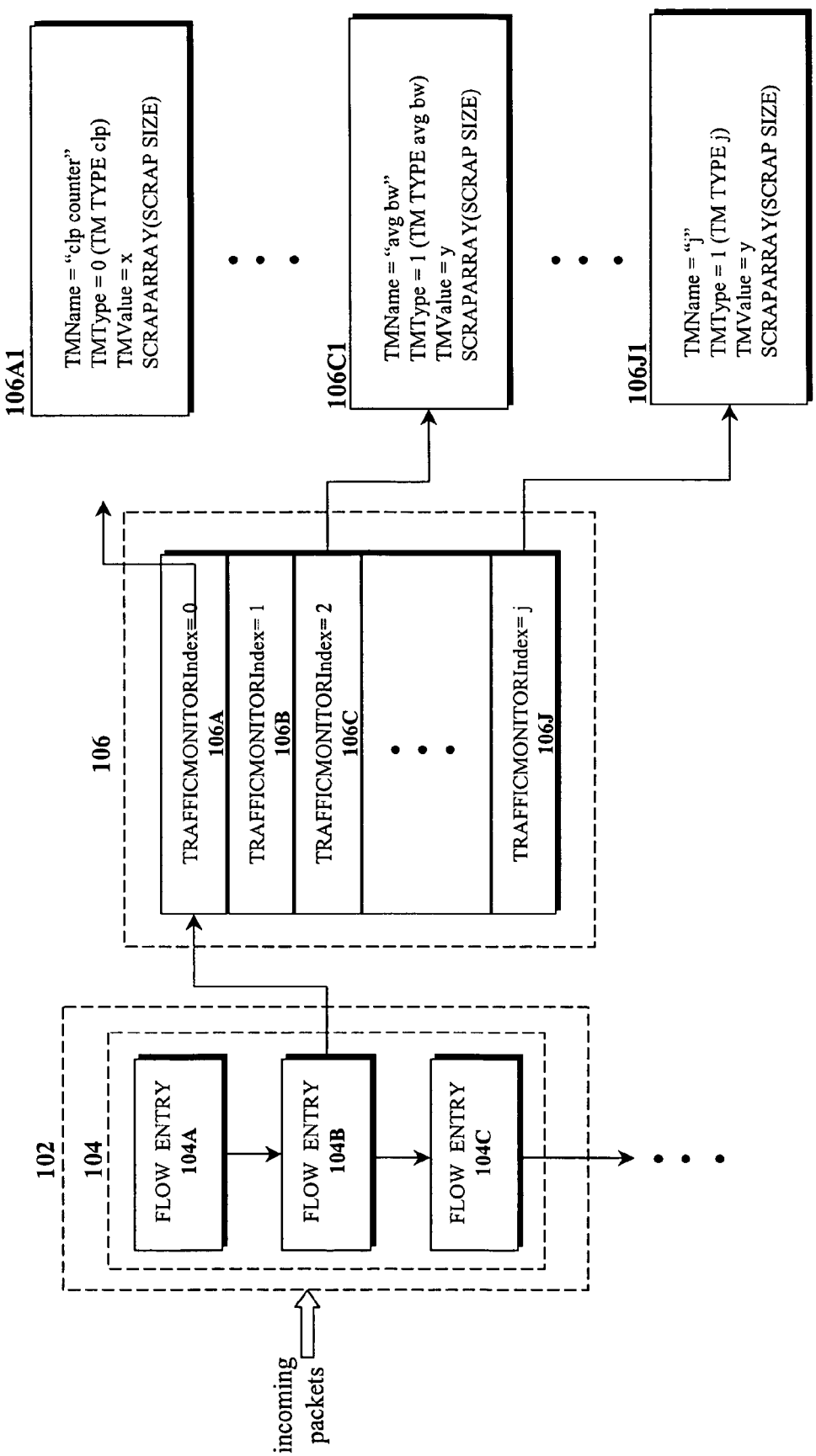
FIG. 1B depicts a data structure for a traffic monitoring mechanism, in accordance with an embodiment of the present invention.

FIG. 1B depicts the data structure for maintaining an easily extensible set of monitors in traffic monitoring mechanism 106. The traffic monitor data structure is chained off flow table 104. Although in the illustrated embodiment, flow table 104 is depicted as a linked list, flow table 104 may utilize any data structure that maintains the traffic monitor data structure. As indicated in FIG. 1B, each flow entry 104A–J of flow table 104 points to a traffic monitor data structure 106A–J having identifiers "TRAFFICMONITORIndex" to identify the traffic monitors. In turn, traffic monitor data structure 106A–J contains at least one entry for every type of traffic monitor supported. Although each monitor type has its own corresponding data structure 106A1–J1, all monitor types share a common set of fields. This common set of fields may be configured to include: "TMName," which identifies the monitor via an identifier string (see, TABLE I); "TMType," which identifies the monitor type (see, TABLE I); "TMValue," which provides the value of an observed parameter, as detected by corresponding monitor; and "SCRAPARRAY(•)," which provides a scrap area, the usage of which will vary depending on the requirements of the particular monitor.

Rule set 110 includes a plurality of rules designed to perform comparisons between traffic monitoring mechanism 106 and a configured or pre-specified value. As such, rule set 110 may include event indicia, indicating the triggering of a rule, condition indicia, representing a conditional or comparison statement, and action indicia, indicating the execution of an action based on the results of the comparison. Rule set 110 may employ comparison operators, such as, GREATER THAN, GREATER THAN OR EQUAL TO, EQUAL TO, LESS THAN OR EQUAL TO, and LESS THAN, for example, to effect the comparisons. Rule set 110 may also employ logical operators, such as, AND, OR, NAND, NOR, etc. to chain various rules together. As will be discussed below, rule set 110 may defined in accordance with rule data structures 158A, 158B, 168A, 168B. Based on the results rendered by the application of the rule set 110 to the received traffic flow, packet classification rule engine 108 reacts to ensure that the received traffic is associated with the appropriate class.

Before describing packet classification rule engine 108, it may be instructive to generally describe an example of a dynamic classification scheme for two types of traffic commonly found in IP-based networks, TCP and UDP traffic. As is well known, TCP is a connection-oriented protocol, which guarantees the delivery and sequential order of the transmitted data. UDP is a connection-less protocol, offering little in the way of delivery guarantees, but provides a more direct means of sending and receiving data. Further, it is to be noted that the depicted dynamic classification schemes, and the rule sets used in effecting transitions between classes, are for illustrative purposes and other classification schemes and rule sets may be implemented without departing from the thrust of the present invention.

FIG. 1C depicts a classification state diagram 125 as well as the TCP rule set for the dynamic classification scheme applied to TCP traffic. Interactive Query Response (IQR) class 126 represents traffic comprising a small number packets that need to be transmitted with high priority and little delay due to the interactive nature of the application (e.g., voice over IP, WWW, e-commerce applications, etc.). Burst class 128 represents traffic comprising a medium number of packets that are transmitted in an infrequent and bursty manner. Bulk class 130 represents traffic comprising a large number packets that are capable of tolerating delays due to large volume transfers (e.g., File Transfer Protocol (FTP) traffic).

As indicated in FIG. 1C, the dynamic classification scheme defaults all new TCP flows to IQR class 126. In accordance with rule $R_0$, if no new TCP packet is detected by traffic monitoring mechanism 106 within one second, IQR class 126 transitions to itself. In accordance with rule $R_1$, if traffic monitoring mechanism 106 detects at least two consecutive TCP packets having a size greater than or equal to LONG (e.g., 512 bytes), IQR class 126 transitions to Burst class 128. Such a rule may be implemented in order to adequately track and classify consecutive long packets having an occasional short packet for separation. In accordance with rule $R_2$, upon traffic monitoring mechanism 106 detecting ten consecutive TCP packets having a size greater than or equal to LONG, Burst class 128 transitions to Bulk class 130. Finally, In accordance with rule $R_3$, if traffic monitoring mechanism 106 does not detect any TCP packets within one second, Bulk class 130 transitions back to IQR class 126.

FIG. 1D depicts a classification state diagram 125 as well as the UDP rule set for the exemplary dynamic classification scheme applied to UDP traffic. Low Rate Real Time (LRT) class 126 represents traffic comprising a small number packets that need to be transmitted in real time. High Rate Real Time (HRT) class 128 represents traffic comprising a large number of packets that need to transmitted in real time. Non-Real Time (NRT) class 130 represents traffic that does not require real time transfers.

As indicated in FIG. 1D, the dynamic classification scheme defaults all new UDP flows to LRT class 136. In accordance with rule $R_0$, if traffic monitoring mechanism 106 does not detect any packets for a certain interval of time (e.g., 1 sec), LRT class 136 transitions to HRT class 140. In accordance with rule $R_1$, upon traffic monitoring mechanism 106 detecting a uni-modal inter-arrival time distribution (e.g., flowing video packets), HRT class 138 transitions to NRT class 140. Finally, in accordance with rule $R_2$, if traffic monitoring mechanism 106 detects transmissions of at least 25 UDP packets per second and available bandwidth of at least 50 Kbps, NRT class 140 transitions back to LRT class 136.

Figure 1E:
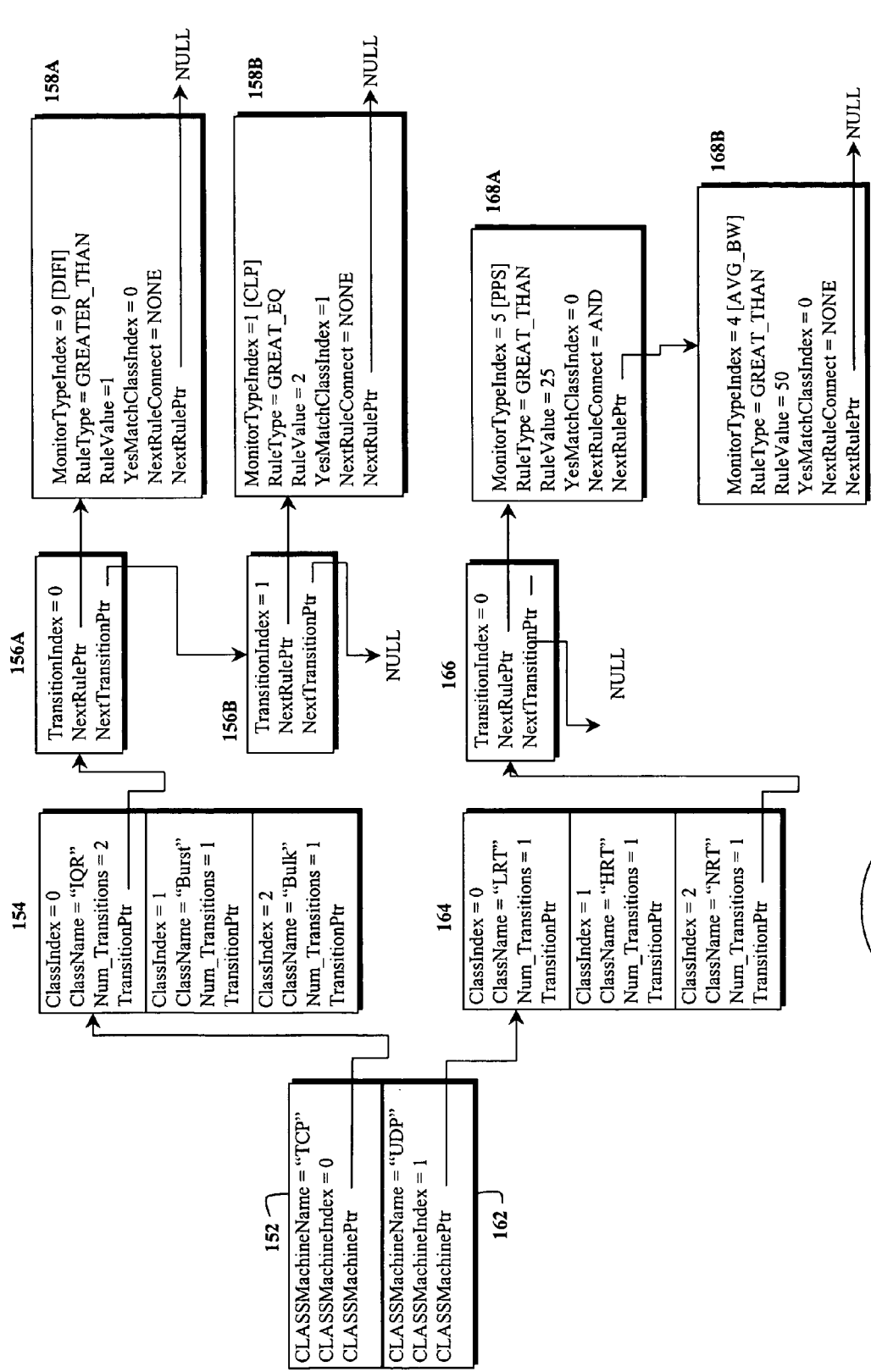
FIG. 1E depicts a data structure for a packet classification rule engine, constructed and operative in accordance with an embodiment of the present invention.

FIG. 1E depicts a data structure 150 for packet classification rule engine 108. Packet classification rule engine 108 performs actions to classify the received packets into their proper class in response to the information provided by flow manager mechanism 102 and traffic monitoring mechanism 106. To this end, classification rule engine data structure 150 enables a user to specify a configurable number of classes, as well as transitions between those classes, based on a configurable set of rules and actions. For purposes of illustration, data structure 150 depicted in FIG. 1E is based on the dynamic classification schemes 125, 135 developed above for TCP and UDP traffic, respectively. Classification rule engine data structure 150 may be configured to accommodate any type of IP-based traffic. In the illustrated embodiment, rule engine data structure 150 contemplates the dynamic classification of TC and UDP traffic by employing classification machines that relate to the two traffic types: a TCP classification machine data structure 152 and a UDP classification machine data structure 162. Each classification machine data structure 152, 162 may correspond to three or more classes. For example, TCP classification machine data structure 152 may correspond to IQR class 126, Burst class 128, and Bulk class 130. Similarly, UDP classification machine data structure 162 may contain LRT class 136, HRT class 138, and NRT class 140. The invention is not limited in this respect, however, as more or less classes may be implemented.

As indicated in FIG. 1E, classification machine data structures 152, 162 may share a common set of fields. This common set of fields may be configured to include: "ClassName," which identifies the type of traffic accommodated by the data structure and "ClassIndex," which identifies the index number associated with the data structure. Upon determining which classification machine 152, 162 the packets belong to, classification rule engine data structure 150 may employ a pointing mechanism, such as, "CLASSPointer" to point to traffic class traffic structures 154, 164 corresponding to the different classes of traffic.

Traffic class data structures 154, 164 may share a common set of fields. This common set of fields may be configured to include: "ClassIndex," which identifies the number assigned to the class; "ClassName," which identifies the name of the class; and "Num_Transitions," which identifies the number of transitions each class is capable of executing. As indicated in FIG. 1E, traffic class data structure 154 for TCP classification machine 152 includes ClassIndex="0," "1," and "2" and ClassName="IQR," "Burst," and "Bulk" corresponding to the respective three classes of TCP traffic noted above and Num_Transitions="2," "1," "1" corresponding to the different transitions possible in each of the respective classes (see also, FIG. 1D).

Similarly, traffic class data structure 164 for UDP classification machine 162 includes ClassIndex="0," "1," and "2" and ClassName="LRT," "HRT," and "NRT" corresponding to the respective three classes of UDP traffic noted above and Num_Transitions="1," "1" "1" corresponding to the different transitions possible in each of the respective classes (see also, FIG. 1D). In addition, traffic class data structures 154, 164 may also include a pointing mechanism, such as, "TransitionPtr" to point to transition data structures 156A, 156B, 166, corresponding to the different transitions possible for each class of traffic.

Transition data structures 156A, 156B, 166, may share a common set of fields. This common set of fields may be configured to include: "TransitionIndex," which identifies the transition executed by a particular class and "NextRulePtr," which identifies the rule associated with the transition executed by the class. If a particular class is capable of executing two transitions (e.g., Num_Transitions=2), transition data structures 156A, 156B, 166 may implement a pointing mechanism, such as, "NextTransitionPtr," to point to and facilitate the second transition if the conditions for the first transition were not met (i.e., no rule match). If there is are no subsequent transitions, NextTransitionPtr points to a NULL state. For example, as indicated in FIG. 1E, the first of two transition possibilities of IQR class 126 (i.e., ClassIndex=0 and ClassName="IQR"), is denoted as TransitionIndex=0. As illustrated in FIG. 1C, this transition occurs if no TCP packets are received for 1 sec. (see, Rule $R_1$). If the conditions of the rule associated with NextRulePtr of TransitionIndex=0 are not satisfied (i.e., Rule $R_1$ is not matched), NextTransitionPtr points to the next transition, TransitionIndex=1, which occurs if at least 2 consecutive long packets are received (see, Rule $R_4$). If Rule $R_4$ is not matched, NextTransitionPtr points to the NULL state because no other transitions are supported.

As noted above, "NextRulePrt" identifies the rule precipitating the transition executed by the class. As indicated in FIG. 1E, the rules are defined in rule data structures 158A, 158B, 168A, 168B. Rule data structures 158A, 158B, 168A, 168B may share a common set of fields. This common set of fields may be configured to include: "MonitorTypeIndex," which identifies the type of traffic monitor used by the rule; "RuleType," which identifies the comparison operators used by the rule; "RuleValue," which represents the value the rule compares to the values observed by the traffic monitor; "YesMatchClassIndex," which identifies the class to be designated based on a rule match; "NextRuleConnect," which indicates the logical operator used to chain to another rule before transitioning classes; and "NextRulePtr," which identifies the next rule to be examined before transitioning classes.

By way of example, consider transition data structures 156A, 156B. As indicated in FIG. 1E, transition data structure 156A stems from IQR class 126 (i.e., ClassIndex=0), which is capable of two transitions (i.e., Num_Transitions=2), due to compliance with Rules $R_0$ or $R_1$ (see, FIG. 1C). Because the rules (and transitions) are executed sequentially, transition data structures 156A first points to corresponding rule data structure 158A, which represent Rule $R_0$. Rule data structure 158A provides that the rule employs a DIFI monitor (i.e., MonitorTypeIndex=9), which observes the inter-arrival time between a current packet and a previous packet. Rule data structure 158A further provides that the rule employs the comparison operator (i.e., RuleType) GREATER THAN, and the comparison value (i.e., RuleValue) 0, thereby indicating that the inter-arrival time observed by the DIFI monitor has to be greater than 1 predetermined time interval (e.g., $\mu$sec., msec., sec., etc.), in order for IQR class 126 to transition back to itself (i.e., YesMatchClassIndex=0, see also, FIG. 1C).

If the rule manifested by rule data structure 158A is not matched by the observed traffic, transition data structure 156A then points, by virtue of NextTransitionPtr, to transition data structure 156B, which points to rule data structure 158B representing Rule $R_1$. Rule data structure 158B provides that the rule employs a CLP monitor (i.e., MonitorTypeIndex=0), which observes the number of consecutive LONG packets. Rule data structure 158A further provides that the rule employs the comparison operator (i.e., RuleType) GREATER THAN or EQUAL TO, and the comparison value (i.e., RuleValue) 2, thereby indicating that the number observed by the CLP monitor has to be greater than or equal 2 packets in order to effect a transition to Burst class 128 (i.e., YestMatchClassIndex=1, see also, FIG. 1C).

With respect to rule data structures 168A, 168B, FIG. 1E also demonstrates the capability of chaining of rules noted above. Transition data structure 166 stems from NRT class 140 (i.e., ClassIndex=2), which is capable of a single transition (i.e., Num_Transition=1), due to compliance with Rule $R_2$ (see, FIG. 1D). Transition data structure 156A points to corresponding rule data structure 168A, which represents Rule $R_2$. Rule data structure 168A provides that the rule employs a PPS monitor (i.e., MonitorType=5), which calculates the average packets-per-second. Rule data structure 168A further provides that the rule employs the comparison operator (i.e., RuleType) GREATER THAN, and the comparison value (i.e., RuleValue) 25, thereby indicating that the number observed by the PPS monitor must be greater than 25 packets in order to effect a transition to LRT class 136 (i.e., YesMatchClassIndex=0, see also, FIG. 1D).

However, rule data structure 168A also provides that there is an additional condition (or rule) that must be complied with before completely transitioning into LRT class 136. Specifically, rule data structure 168A includes the string, NextRuleConnect=AND, indicating that that rules or conditions manifested by rule data structure 168A are to chained to a subsequent rule or condition indicated by NextRulePtr. NextRulePtr points to rule data structure 168B, which provides that the subsequent rule or condition employs a AVG_BW monitor (i.e., MonitorTypeIndex=4), which determines the average bandwidth. Rule data structure 168B also provides that the rule employs the comparison operator (i.e., RuleTime) GREATER THAN, and the comparison value (i.e., RuleValue) 50, thereby indicating that the bandwidth observed by the AVG_BW monitor must be greater than 50 Kbps in order to completely match the transition rule and effect a transition to LRT class 136 (i.e., YesMatchClassIndex=0, see also, FIG. 1D).

Figure 2A:
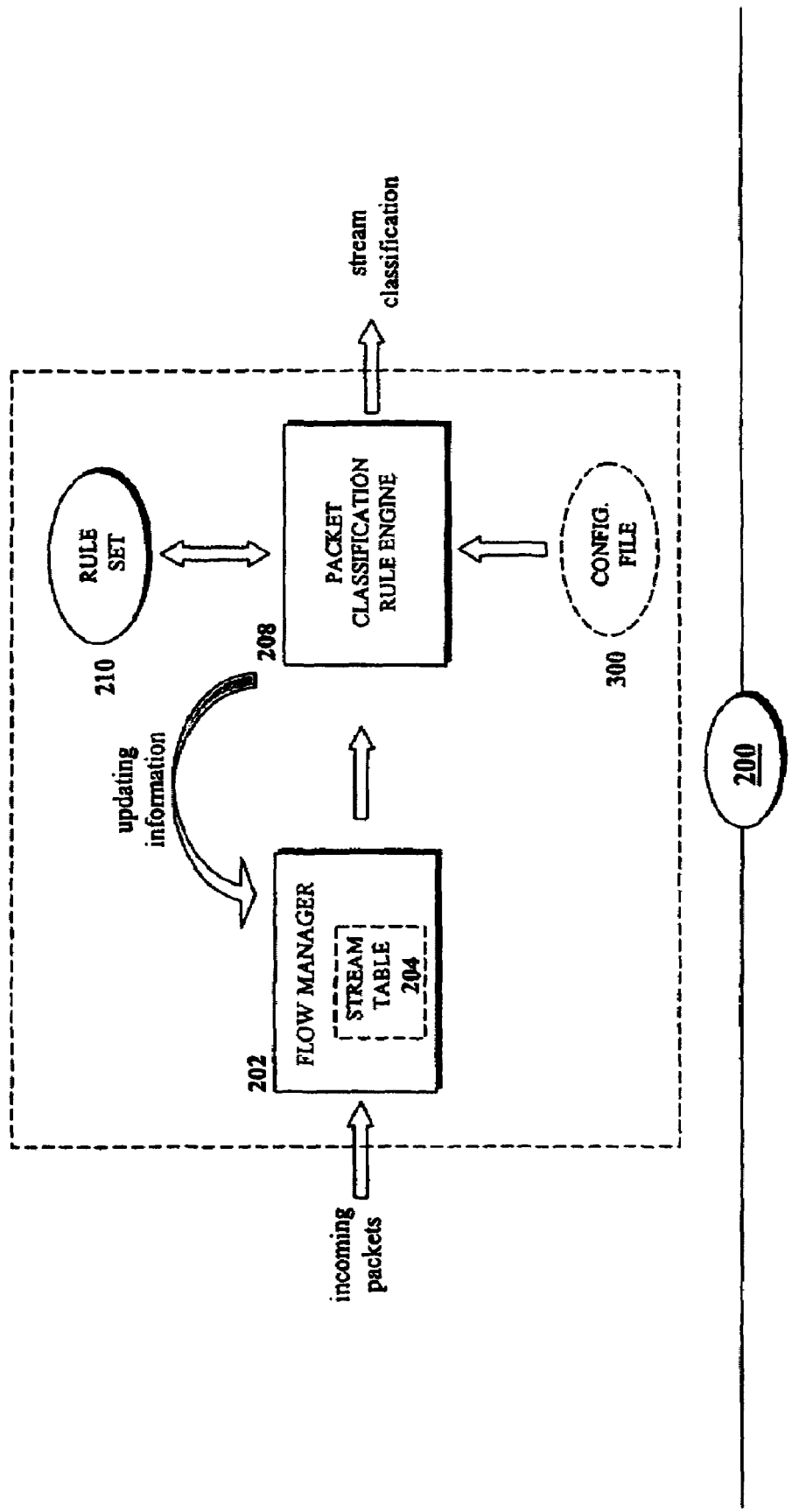
FIG. 2A depicts a functional block diagram of a classification rule engine system, constructed and operative in accordance with another embodiment of the present invention.

FIG. 2A is a functional block diagram depicting Layer-7 classification system 200, constructed and operative in accordance with another embodiment of the present invention. System 200 classifies network traffic based on Layer-7 classification schemes. As indicated in FIG. 2A, system 200 comprises flow manager mechanism 202, a packet classification rule engine 208, a configuration file 300, and rule set 210. As will be described below, rule set 210, as well as the actions taken by packet classification rule engine 208, may be defined, initialized, and reconfigured with respect to particular traffic flows in configuration file 300.

Much like the flow manager mechanism of system 100, flow manager mechanism 202 is configured to receive the incoming data packets, identify and track the traffic flows associated with the received packets, as well as monitor the traffic flow statistics. Because Layer-7 classification schemes operate on packet payload information, only a few packets within a traffic flow need to be examined to correctly identify the class of traffic. As such, flow manager mechanism 202 may identify the traffic flows by examining a predetermined packet or packets per flow. Flow manager mechanism 202 may include a flow table mechanism 204, which captures the relevant packet information, provides a look-up mechanism to identify which traffic flow the receive packet belongs to, and updates the captured information accordingly. Such updates may include introducing new traffic flows, deleting stale traffic flows, or including pointers to different flows.

Figure 2B:
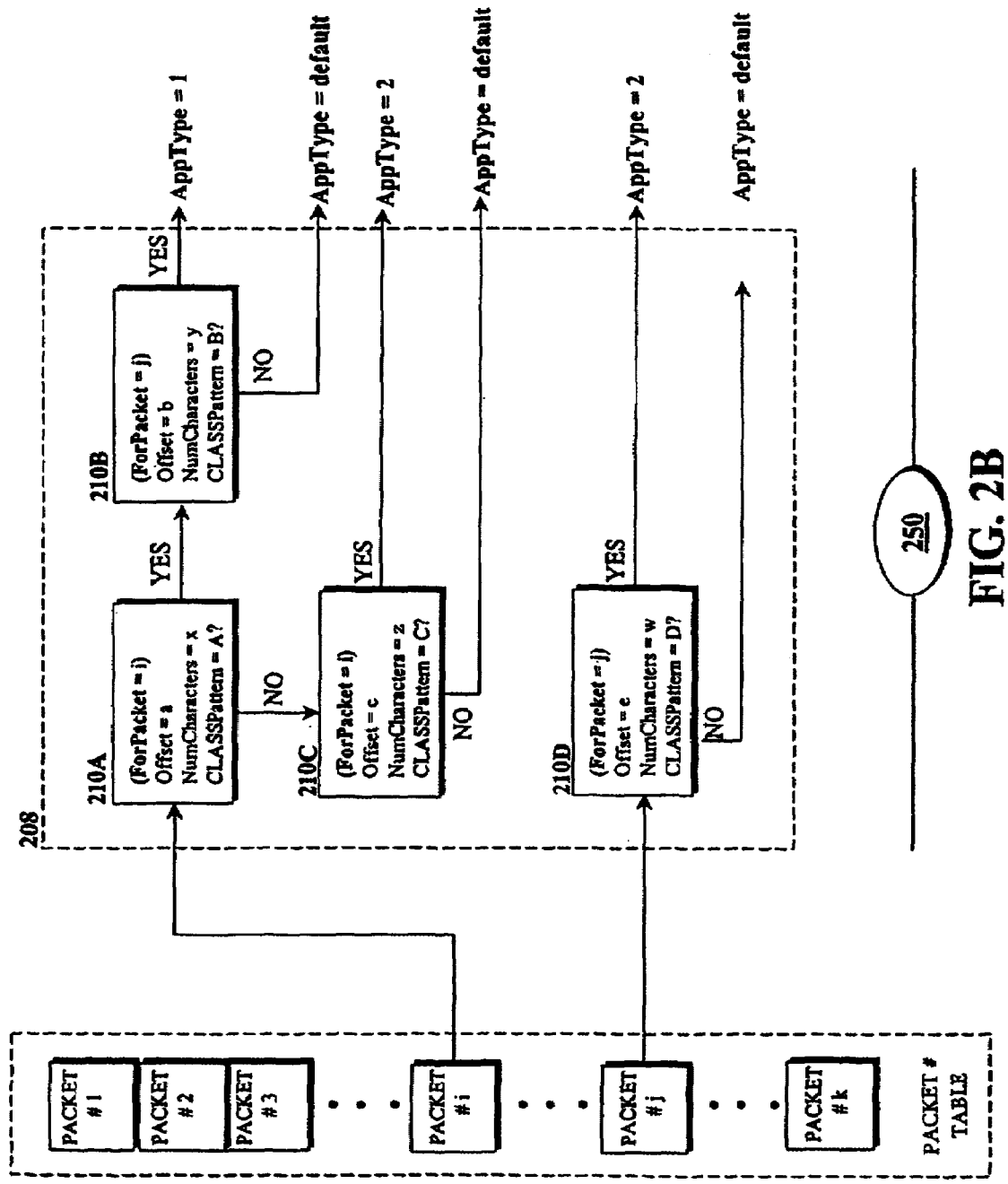
FIG. 2B depicts a data structure for a packet classification rule engine, constructed and operative in accordance with another embodiment of the present invention.

FIG. 2B depicts a data structure 250 for Layer-7 packet classification rule engine 208. Packet classification rule engine 208 is constructed as linked list of pattern match rules 210A–D. Each linked list is chained off an array entry with the packet number in a flow being used as the array index. Packets entering the system are first identified as belonging to a particular flow by the flow manager mechanism 202. As such, classification rule engine data structure 250 enables a user to specify a configurable number of classes, as well as transitions between those classes, based on a configurable set of rules and actions.

Classification rule engine data structure 250 may be configured to accommodate any type of IP-based traffic and, as noted above, because Layer-7 classification schemes operate on packet payload information, only a few packets within a traffic flow need to be examined. Accordingly, as indicated in FIG. 2B, after a flow of packets are receive by flow manager mechanism 202, classification rule engine 208 searches the set of rules using a packet number as an index into the data structure. As such, the rules corresponding to a particular packet number are searched to determine a match.

In the illustrated embodiment, packet numbers, (e.g., #i, #j) within flow A are used as an index. Designating packet numbers #i, #j as an index may be based on the knowledge that, under Layer-7 schemes, packet numbers #i, #j provide an indication as to the type of traffic in flow A. Such knowledge may be garnered from empirical data, heuristics, vendor specifications, or industry knowledge. Classification rule engine 208 then searches the set of rules 210A–D corresponding to packet numbers #i, #j to determine if there is a match between the information contained in the pointed-to packets and the rule values.

As noted above, Layer-7 classification rule engine 208 is constructed as linked list of pattern match rules 210A–D. Rules 210A–D are designed to perform comparisons between the flows configured or pre-specified value. Rules 210A–D may include event indicia, indicating the triggering of a rule, condition indicia, representing a conditional or comparison string, and action indicia, indicating the execution of an actin based on the results of the comparison. Rules 210A–D may also employ comparison operators, such as, GREATER THAN, GREATER THAN OR EQUAL TO, EQUAL TO, LESS THAN OR EQUAL TO, and LESS THAN, for example, to effect the comparisons. Rules 210A–D may also employ logical operators, such as, AND, OR, NAND, NOR, etc. to chain various rules together.

As such, classification rule engine data structure 250 may employ pattern match rules 210A–D having a common set of fields. This common set of fields may be configured to include: "Offset," which specifies the number of bytes from the beginning of the pointed-to packets where traffic type information is located; "NumCharacters," which indicates the number of characters, beginning at the specified Offset, that are to be examined and compared for pattern matching; "CLASSPattern," which identifies the pattern used to match the information contained in the pointed-to packet with a particular class; and "AppType," which identifies the particular class associated with the pointed-to packet.

Returning to FIG. 2B, with respect to packet #i, classification rule engine data structure 250 points to packet #i of flow A to seek traffic type information. Upon accessing packet #i, classification rule engine data structure 250 searches out all the relevant pattern matching rules for packet #i, which for this case are rules 210A–C.

Classification rule engine data structure 250 then sequentially applies the relevant pattern matching rules to determine a match. For example, classification rule engine data structure 250 applies rule 210A, which compares the x number of characters beginning at Offset a of packet #i with the pattern A. If the comparison with rule 210A does not consummate in a match, classification rule engine data structure 250 skips to rule 210C for subsequent comparisons. If any of the comparisons result in a match, classification rule engine data structure 250 designates the class of the traffic flow (e.g., AppType) based on the matched pattern (e.g., CLASSPattern). A flag (not shown) is then set in the Flow Table 204, indicating that the entire traffic flow (e.g., traffic flow A) is to be designated as traffic class AppType and future packets belonging to the traffic flow will not be examined. If no comparisons result in a match, classification rule engine data structure 250 maintains the traffic class the same and informs Flow Table 204 to continue examining the data structure in accordance with the next packet number that may have an indication as to the type of traffic in the flow.

Classification rule engine data structure 250 also provides for the chaining of rules to subsequent rules. The chaining of rules is contemplated because certain application identification may be based on heuristics, which may require pattern matching in two or more successive packets. When all the rules are traversed, there is only the pointed-to-packet in hand. Thus, it a successful match causes the transition to a chained rule for a subsequent packet, classification rule engine data structure 250 stores a pointing mechanism to the chained rule in Flow Table 204. All subsequent packets for the particular flow will no longer index off the packet-number. Instead, when the packet with the number corresponding to the transitioned chain rule arrives, classification rule engine data structure 250 will compare the information contained in the packet to determine a match. If a match exists, classification rule engine data structure 250 will either proceed to the next rule (if it exists) or an application type is determined. If the match is not successful, application type and class designation remain unchanged.

For example, in the case where there exists a match in rule 210A, as indicated in the illustrated embodiment (i.e., the x number of characters beginning at Offset a of packet #i contain pattern A), classification rule engine data structure 250 proceeds to rule 210B to determine if there is a subsequent match (i.e., do the y number of characters beginning at Offset b of packet #j contain pattern B). If there is a subsequent match, classification rule engine data structure 250 designates the traffic class as AppType=1; otherwise, classification rule engine date structure 250 designates the traffic class as the default class.

In this embodiment, all traffic flows are assumed to be assigned a default classification when they are initially received. This default application is based on the Layer-4 port numbers. As such, even if the Layer-7 Classification does not yield any conclusive results, Layer-7 packet classification rule engine 208 falls back on the results of the Layer-4 port numbers to classify the traffic flows.

FIG. 3 depicts a packet classification rule engine configuration file 300, constructed and operative in accordance with aspects of an embodiment of the present invention. Configuration file 300, provides an easily modifiable interface to the classification rule engine, which enables a user to develop a classification algorithm, translate that algorithm into the set of rules supported by the rule-engine and enter the rules in the form of a simple grammar into a file. The classification rule-engine on power-up will execute the classification algorithms. A benefit of such a configuration file and classification rule-engine is that modifying and upgrading classification algorithms, is a matter of simply making changes to a text file rather than providing hardware or software upgrades.

As indicated in FIG. 3, configuration file 300 provides an example grammar through which the classification rule engine may be configured as part of a bandwidth management system. In illustrated embodiment, configuration file 300 specifies the network device physical ports that are enabled and the bandwidth associated with each port. There is also a policy setting that allows the user to select the classification result from either a static layer-7 classifier or a dynamic classifier. Both types of classifiers run in parallel and their results are combined to obtain a final class.

The user is also allowed to specify the number of distinct classes and their names. In addition the scheduler type is configurable along with the scheduler parameters such as queue weights etc. For the Layer-7 classifier, the classification engine uses a rule to identify an application and then maps that application to a particular class. Finally, the grammar contains rules for transitioning between classes for the dynamic classifier.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described with specific reference to the actual software code or specialized hardware components. The absence of such specific references is feasible because it is clearly understood that artisans or ordinary skill would be able to design software and control hardware to implement the embodiments of the present invention based on the description herein.

Moreover, the processes associated with the present embodiments may be stored in any storage device, such as, for example, non-volatile memory, an optical disk, magnetic tape, or magnetic disk. Furthermore, the processes may be programmed when the system is manufactured or via a computer-readable medium at a later data. Such a medium may include any of the forms listed above with respect to storage devices and may further include, for example, a carrier wave modulated, or otherwise manipulated, to convey instructions that can be read, demodulated/decoded and executed by the system.

The foregoing description of the preferred embodiments is provided to enable any person skilled in the art to make or use the present invention. Various modifications to these embodiments are possible, and the generic principles presented herein may be applied to other embodiments as well.

For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such as code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claim is:

1. A data flow classification system comprising:
   a data flow managing mechanism configured to identify, track, and manage said data flow;
   a rule set including a plurality of rules for comparing information contained in said data flow with pre-specified values;
   a configurable classification rule engine for initially classifying said data flow into one of a plurality of traffic classes based on results of said comparisons between said rules and said pre-specified values, and subsequently reclassifying said data flow into a different one of the plurality of traffic classes based on different results of said comparisons;
   a configuration filed for configuring said classification rule engine and for specifying said pre-specified values and information regarding at least one of said data flow, said rule set, and said plurality of traffic classes,
   wherein said configuration file comprises a format that allows for the modification and reconfiguration of said classification rule engine, said data flow, said rule set, and said plurality of traffic classes.

2. The system of claim 1, wherein said data flow managing mechanism includes a flow table mechanism configured to perform at least one of capturing said information contained in said data flow, mapping a packet to a data flow, identifying said data flow based on said captured information, registering active data flows, and deleting inactive data flows.

3. The system of claim 2, wherein said plurality of rules comprise a data structure including,
   event indicia for indicating the invocation of one of said rules, condition indicia for representing a comparison or condition between said one of said rules and said pre-specified values, and
   action indicia for indicating the execution of an action based on results of said comparison.

4. The system of claim 3, wherein said action indicia includes information for at least one of designating said data flow as one of said traffic classes and chaining to another of said rules.

5. The system of claim 4, wherein said classification engine classifies said data flow into one of said traffic classes in accordance with a dynamic classification scheme.

6. The system of claim 5, wherein said data flow managing mechanism identifies said data flow as a particular type of traffic.

7. The system of claim 6, further comprising a traffic monitoring mechanism configured to monitor attributes of said data flow and to provide update information to said data flow managing mechanism.

8. The system of claim 7, wherein said traffic monitoring mechanism comprises a plurality of traffic monitors, each of said traffic monitors being capable of monitoring and measuring at least one predetermined attribute of said data flow.

9. The system of claim 8, wherein said traffic monitors comprise a data structure including,
identifier indicia for identifying a type of traffic monitor, and
value indicia for indicating a value measured by said traffic monitor.

10. The system of claim 9, wherein classification engine comprises a data structure including,
traffic type indicia indicating the traffic type of said data flow,
traffic class indicia representing the different classes of traffic corresponding to the traffic type,
transition indicia indicating transitions from one of said traffic classes to another of said traffic classes, and
rule indicia containing traffic monitor information, corresponding rule information, said predefined values, and transition class information,
wherein said classification engine compares said traffic monitor information to said rule and said predefined values to classify said data flow into a traffic class corresponding to said traffic type.

11. The system of claim 4, wherein said classification engine classifies said data flow into one of said traffic classes in accordance with a Layer-7 classification scheme.

12. The system of claim 11, wherein said classification engine selects a predetermined packet from said data flow containing application information.

13. The system of claim 12, wherein said classification engine comprises a data structure including,
information location indicia indicating the location where said application information is contained within said predetermined packet,
character indicia defining the number of characters within said location indicia to be compared, and
pattern indicia representing a pattern corresponding to a particular traffic class.

14. The system of claim 13, wherein said classification engine compares said pattern indicia to said character indicia to classify said data flow into said traffic class.

15. A method of classifying a data flow, comprising:
identifying, tracking, and managing said data flow by a data flow managing mechanism;
comparing information contained in said data flow with a plurality of rules containing pre-specified values, said plurality of rules included in a rule set; and
initially classifying, by a configurable classification rule engine, said data flow into one of a plurality of traffic classes based on results of said comparisons between said rules and said pre-specified values, and subsequently reclassifying said data flow into a different one of the plurality of traffic classes based on different results of said comparisons;
wherein said classification rule engine is configured by a configuration file, said configuration file specifying said pre-specified values and information regarding at least one of said data flow, said rule set, and said plurality of traffic classes, and
wherein said configuration file comprises a format that allows for the modification and reconfiguration of said classification rule engine, said data flow, said rule set, and said plurality of traffic classes.

16. The method of claim 15, wherein said data flow managing mechanism includes a flow table mechanism configured to perform at least one of capturing said information contained in said data flow, mapping a packet to a data flow, identifying said data flow based on said captured information, registering active data flow, and deleting inactive data flows.

17. The method of claim 16, wherein said plurality of rules comprise a data structure including,
event indicia for indicating the invocation of one of said rules, condition indicia for representing a comparison or condition between said one of said rules and said pre-specified values, and
action indicia for indicating the execution of an action based on results of said comparison.

18. The method of claim 17, wherein said action indicia includes information for at least one of designating said data flow as one of said traffic classes and chaining to another of said rules.

19. The method of claim 18, wherein said classification engine classifies said data flow into one of said traffic classes in accordance with a dynamic classification scheme.

20. The method of claim 19, wherein said data flow managing mechanism identifies said data flow as a particular type of traffic.

21. The method of claim 20, further comprising a traffic monitoring mechanism configured to monitor attributes of said data flow and to provide update information to said data flow managing mechanism.

22. The method of claim 21, wherein said traffic monitoring mechanism comprises a plurality of traffic monitors, each of said traffic monitors being capable of monitoring and measuring at least one predetermined attribute to said data flow.

23. The method of claim 22, wherein said traffic monitors comprise a data structure including,
identifier indicia for identifying a type of traffic monitor, and value indicia for indicating a value measured by said traffic monitor.

24. The method of claim 23, wherein classification engine comprises a data structure including,
traffic type indicia indicating the traffic type of said data flow,
traffic class indicia representing the different classes of traffic corresponding to the traffic type,
transition indicia indicating transitions from one of said traffic classes to another of said traffic classes, and
rule indicia containing traffic monitor information, corresponding rule information, said predefined values, and transition class information,
wherein said classification engine compares said traffic monitor information to said rule and said predefined values to classify said data flow into a traffic class corresponding to said traffic type.

25. The method of claim 18, wherein said classification engine classifies said data flow into one of said traffic classes in accordance with a Layer-7 classification scheme.

26. The method of claim 25, wherein said classification engine selects a predetermined packet from said data flow containing application information.

27. The method of claim 26, wherein said classification engine comprises a data structure including,
information location indicia indicating the location where said application information is contained within said predetermined packet,
character indicia defining the number of characters within said location indicia to be compared, and
pattern indicia representing a pattern corresponding to a particular traffic class.

28. The method of claim 27, wherein said classification engine compares said pattern indicia to said character indicia to classify said data flow into said traffic class.

29. A machine-readable medium encoded with a plurality of processor-executable instruction sequences for classifying a data flow, said instruction sequences comprising:
identifying, tracking, and managing said data flow by a data flow managing mechanism;
comparing information contained in said data flow with a plurality of rules containing pre-specified values, said plurality of rules include in a rule set; and
initially classifying, by a configurable classification rule engine, said data flow into one of a plurality of traffic classes based on results of said comparisons between said rules and said pre-specified values, and subsequently reclassifying said data flow into a different one of the plurality of traffic class based on different results of said comparisons;
wherein said classification rule engine is configured by a configuration file, said configuration file specifying said pre-specified values and information regarding at least one of said data flow, said rule set, and said plurality of traffic classes, and
wherein said configuration file comprises a format that allows for the modification and reconfiguration of said classification rule engine, said data flow, said rule set, and said plurality of traffic classes.

30. The machine-readable medium of claim 29, wherein said data flow managing mechanism includes a flow table mechanism configured to perform at least one of capturing said information contained in said data flow, mapping a packet to a data flow, identifying said data flow based on said captured information, registering active data flows, and deleting inactive data flows.

31. The machine-readable medium of claim 30, wherein said plurality of rules comprise a data structure including,
event indicia for indicating the invocation of one of said rules, condition indicia for representing a comparison or condition between said
one of said rules and said pre-specified values, and
action indicia for indicating the execution of an action based on results of said comparison.

32. The machine-readable medium of claim 31, wherein said action indicia includes information for at least one of designating said data flow as one of said traffic classes and chaining to another of said rules.

33. The machine-readable medium of claim 32, wherein said classification engine classifies said data flow into one of said traffic classes in accordance with a dynamic classification scheme.

34. The machine-readable medium of claim 33, wherein said data flow managing mechanism identifies said data flow as a particular type of traffic.

35. The machine-readable medium of claim 34, further comprising a traffic monitoring mechanism configured to monitor attributes of said data flow and to provide update information to said data flow managing mechanism.

36. The machine-readable medium of claim 35, wherein said traffic monitoring mechanism comprises a plurality of traffic monitors, each of said traffic monitors being capable of monitoring and measuring at least one predetermined attribute of said data flow.

37. The machine-readable medium of claim 36, wherein said traffic monitors comprise a data structure including,
identifier indicia for identifying a type of traffic monitor, and value indicia for indicating a value measured by said traffic monitor.

38. The machine-readable medium of claim 37, wherein classification engine comprises a data structure including,
traffic type indicia indicating the traffic type of said data flow, traffic class indicia representing the different classes of traffic corresponding to the traffic type,
transition indicia indicating transitions from one of said traffic classes to another of said traffic classes, and
rule indicia containing traffic monitor information, corresponding rule information, said predefined values, and transition class information,
wherein said classification engine compares said traffic monitor information to said rule and said predefined values to classify said data flow into a traffic class corresponding to said traffic type.

39. The machine-readable medium of claim 32, wherein said classification engine classifies said data flow into one of said traffic classes in accordance with a Layer-7 classification scheme.

40. The machine-readable medium of claim 39, wherein said classification engine selects a predetermined packet from said data flow containing application information.

41. The machine-readable medium of claim 40, wherein said classification engine comprises a data structure including,
information location which indicating the location where said application information is contained within said predetermined packet,
character indicia defining the number of characters within said location indicia to be compared, and
pattern indicia representing a pattern corresponding to a particular traffic class.

42. The machine-readable medium of claim 41, wherein said classification engine compares said pattern indicia to said character indicia to classify said data flow into said traffic class.

* * * * *

UNITED STATES PATENT AND TRADEMARK OFFICE
CERTIFICATE OF CORRECTION

| | |
|---|---|
| PATENT NO. | : 6,975,592 B1 |
| APPLICATION NO. | : 09/717292 |
| DATED | : December 13, 2005 |
| INVENTOR(S) | : Seddigh et al. |

It is certified that error appears in the above-identified patent and that said Letters Patent is hereby corrected as shown below:

In column 14, line 2, delete "flow" and insert --flows--.

In column 15, line 11, delete "include" and insert --included--.

In column 16, line 41, delete "which" and insert --indicia--.

Signed and Sealed this

First Day of August, 2006

JON W. DUDAS
*Director of the United States Patent and Trademark Office*